FIG. I

INVENTORS
James M. Lapeyre
Robert F. Couret &
Guy L. Fougere
ATTORNEYS

United States Patent Office 3,400,398
Patented Sept. 3, 1968

3,400,398
BROADCAST APPARATUS FOR POSITION
DETERMINING SYSTEM
James M. Lapeyre and Robert F. Couret, New Orleans, La., and Guy L. Fougere, Cambridge, Mass., assignors, by direct and mesne assignments, to James M. Lapeyre, New Orleans, La.
Continuation of application Ser. No. 432,670, Feb. 15, 1965. This application Mar. 13, 1967, Ser. No. 632,486
19 Claims. (Cl. 343—106)

ABSTRACT OF THE DISCLOSURE

The present invention is to provide a position locating method and means based on transmission of signals from a single reference point, reception of the signals sequentially at a position spaced from the reference point and the determination of the distance of the position from the reference point, or the determination of the azimuth of the position from a predetermined reference direction through the reference point, or both, according to the timing between the sequential reception of selected signals.

Figure 1:
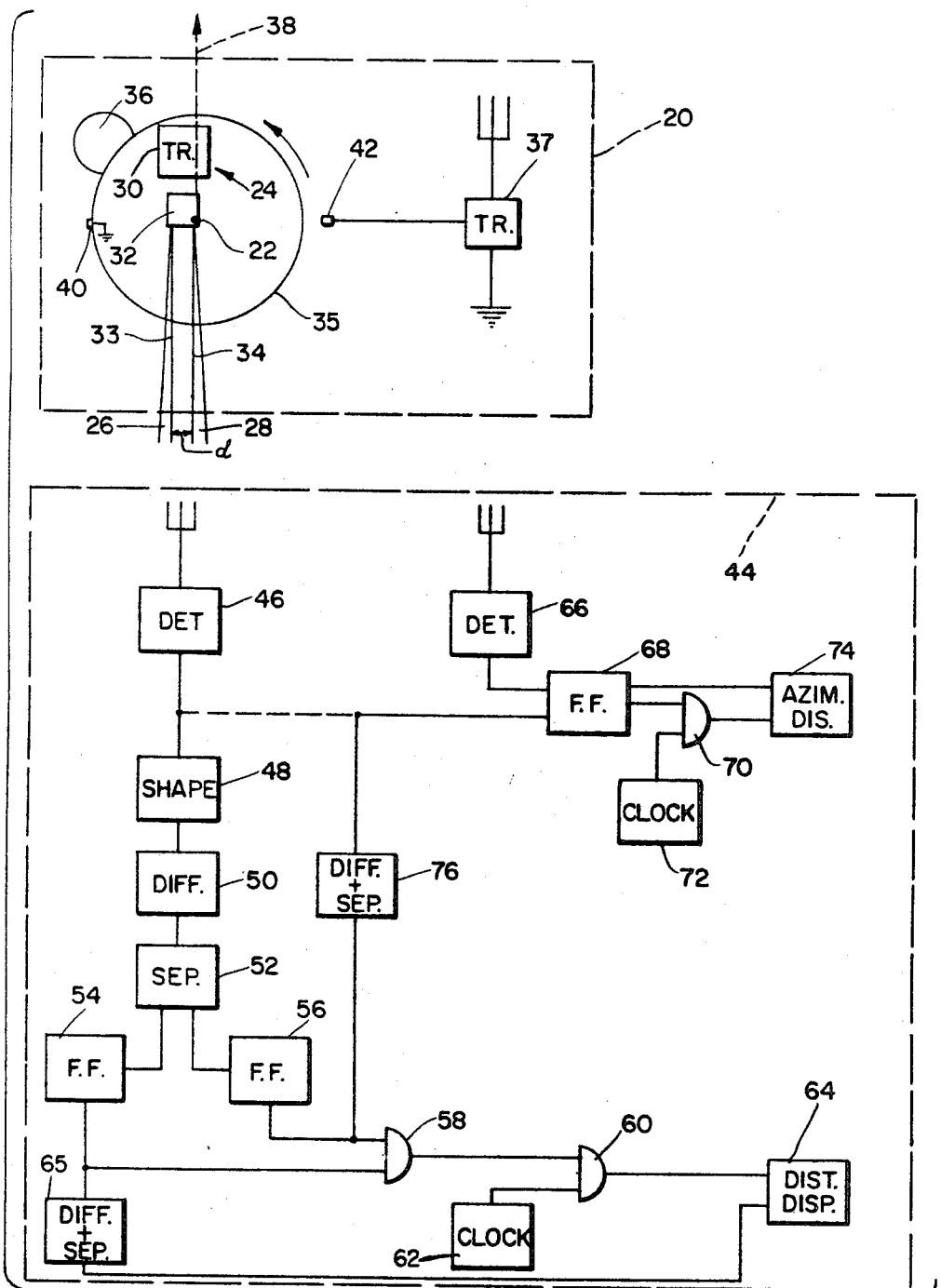

The present invention provides a method and means in which signals are transmitted in the form of two directional beams which are spaced so that the most adjacent or most remote edges, or any two parallel portions of the two beams to the two beams are parallel to one another, and the beams are rotated in azimuth at a substantially constant angular rate about a common center.

The invention further includes means providing a signal pulse upon coincidence of a selected one beam edge with a predetermined reference direction; to provide means for detecting a singnal pulse of the type described and for determining the azimuth of the particular position according to the reception of the pulse and reception of energy indicative of the selected one beam edge or beam portion and to provide in such a system and located at the position the distance, azimuth, or both of which is to be determined, a unit receiver for sequentially detecting the energy of beams being azimuthally rotated at a constant angular rate through that position and means for determining the distance of that position from the reference point according to the timing interval between the detection of the beams by the receiver.

The present invention relates to a broadcast apparatus for position determining system, and is a continuation of our similarly entitled U.S. patent application, Ser. No. 432,670 filed Feb. 15, 1965, now abandoned, and has for an object more particularly a method and means for using electromagnetic radiation beams to determine a position relative to a reference point.

A number of systems are known for locating, either in distance, azimuth, or both, a position relative to another position or reference point. Typically, some such systems propose to determine azimuth by placing, at the reference point, a radio beacon from which a single directional beam of energy is rotated azimuthally at a constant rate, the rotation of the beam being timed from a reference direction. Because directional beams have some divergence, the beam angle has been a source of error, and considerable ingenuity has been devoted to determination of the location of the beam center. Other systems propose to determine distance by using a pair of spaced receiving antennae through which the directional beam sequentially sweeps in rotation. The distance of the antennae from the reference point is then a function of the interval between the times of reception of the beam at the respective antennae. Large spacing between the antennae, or highly sensitive detectors, or both, are, therefore, indicated for use in this latter system. And, particularly, in such a system the measurement of distance is complicated by the need to adjust for changes in the angle between the line joining the antennae and the beam received by the antennae.

A principal object of the present invention is to overcome these and other difficulties by providing a position locating method and means based on transmission of signals from a single reference point, reception of the signals sequentially at a position spaced from the reference point, and the determination of the distance of the position from the reference point, or the determination of the azimuth of the position from a predetermined reference direction through the reference point, or both, according to the timing between the sequential reception of selected signals.

Another object of the present invention is to provide such a method and means in which signals are transmitted in the form of two directional beams which are spaced so that either the most adjacent or most remote edges respectively of the beams are parallel to one another and the beams are rotated in azimuth at a substantially constant angular rate about a common center.

Yet other objects of the present invention are to provide a system of the latter type including means providing a signal pulse upon coincidence of a selected one beam edge with the predetermined reference direction; to provide means for detecting a signal pulse of the type described and for determining the azimuth of the particular position according to the timing between reception of the pulse and reception of energy indicative of the selected one beam edge; and to provide in such a system, and located at the position the distance, azimuth, or both, of which is to be determined, a unit receiver for sequentially detecting the energy of beams being azimuthally rotated at a constant angular rate through that position, and means for determining the distance of that position from the reference point according to the timing interval between the detection of the beams by the receiver.

Other objects of the invention will in part be obvious and will in part appear hereinafter. The invention accordingly comprises the apparatus possessing the construction, combination of elements, and arrangement of parts, and the process comprising the several steps and the relation of one or more of such steps with respect to each of the others, all of which are exemplified in the following detailed disclosure and the scope of the application of which will be indicated in the claims.

Figure 2:
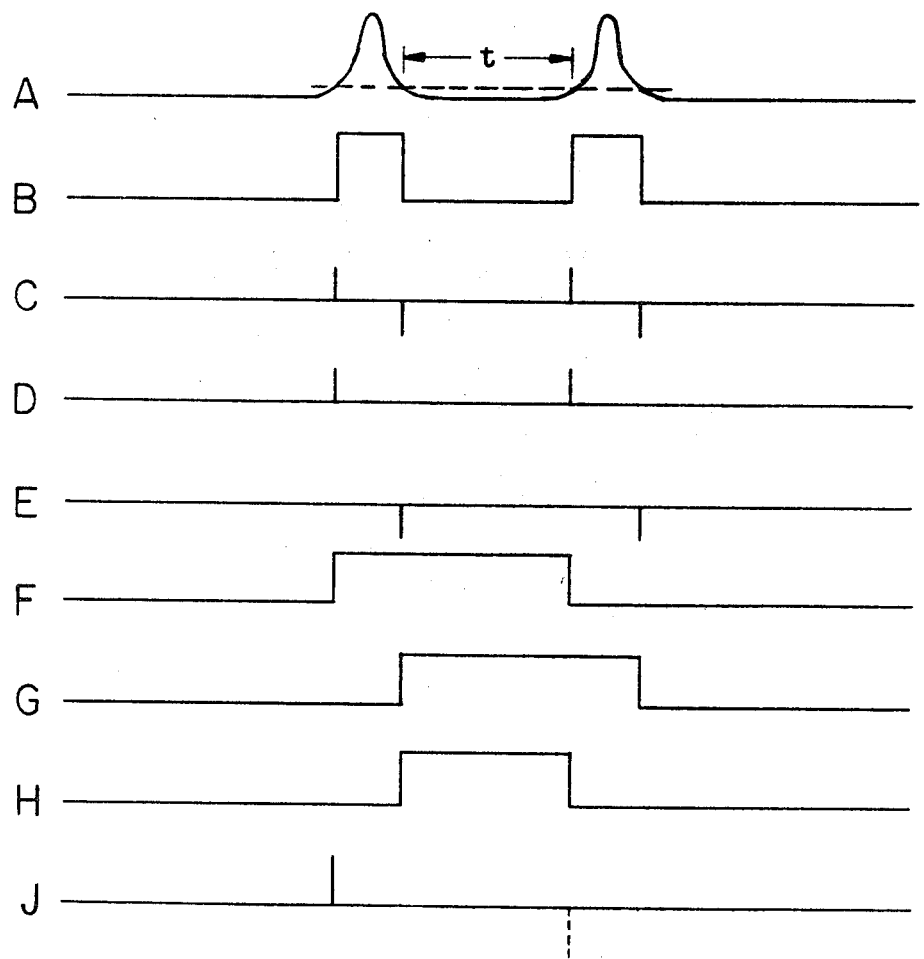

For a fuller understanding of the nature and objects of the present invention, reference should be had to the following detailed description taken in connection with the accompanying drawings wherein:

FIGURE 1 is a block schematic diagram of a position locating system embodying the principles of the present invention; and FIGURE 2 is a plot, on a common time axis, of a number of exemplary wave forms occurring at selected points in the embodiment of FIGURE 1 during operation thereof.

Referring to FIGURE 1 of the drawing there is shown broadcast means, located within the broken line and identified by the reference numeral 20, disposed at or about a reference position or point, for example at 22. Broadcast means 20 include first transmitter 24 for providing a pair of directional beams 26 and 28 of electromagnetic energy. For the purposes of the present invention it is desirable that means 26 and 28 be highly directional. Low-divergence, highly directional beams are readily obtainable at microwave and higher frequencies, i.e. from about one kilomegacycle per second up.

Of course, the higher the frequencies, the less cumbersome is the antenna array required to achieve high directionality. Thus, in the preferred embodiment transmitter 24 is in the form of maser 30, and known beam splitting means 32. The term "maser" is intended to include devices in which generation and amplification of electromagnetic waves at frequencies from the microwave region through infra-red visible and ultra violet, occurs by stimulated emission of radiation.

Beam splitter 32 is mounted with respect to transmitter 30 so as to divide the single beam output of transmitter 30 into the two beams, 26 and 28, each of which can exhibit internal divergence of but a few ten arcseconds where transmitter 30 is a maser. Beam splitter 32 is so adjusted that one edge of beam 26 is substantially parallel to an edge of beam 28, these edges being a pair of edges selected from that pair which are most nearly adjacent one another and the pair of edges most remote from one another or at any portion of the beam therebetween so long as parallelism is preserved between the same portion of each of the two beams. In the preferred embodiment, it will be seen that beam splitter 32 is adjusted so that the most adjacent edges 33 and 34 respectively of beams 26 and 28 are substantially equidistant from one another by a distance, $d$.

Typically, beam splitter 32 can be any one of a number of known devices, such as a knife edge prism and two plane mirrors adjustable for setting selected edges 33 and 34 of the beams in the requisite parallelism. Beams 26 and 28 are preferably continuously radiated, or, if intermittent as is the output of a number of masers, are of a predetermined pulse repetition rate, $f_1$, which of course is a number of orders of magnitude lower than the fundamental frequency of the beam energy.

As means for moving the two beams in rotation about a common center at a substantially constant angular velocity, while maintaining the requisite parallelism between selected beam edges, the invention includes rotatable apparatus such as turntable 35, or the like, upon which the maser and beam splitter are mounted such that both beams 26 and 28 can be simultaneously rotated in azimuth about a position of reference such as 22. Preferably, beam splitter 32 is so located that the edge of one of the beams, for example edge 34 of beam 28, lies on the center of rotation of turntable 35, and for the sake of convenience, that center of rotation is coincident with reference point 22. Means, shown only schematically at 36, such as a constant speed motor and appropriate gears of accurate structure, are provided for rotating the turntable at a substantially constant angular velocity, $a$.

Broadcast means 20 also includes second transmitter 37 which is intended to provide an omnidirectional pulse broadcast of electromagnetic energy. Output of transmitter 37 is to be pulsed upon coincidence of the beam edge 34 with an arbitrary predetermined reference direction radially extending from reference point 22 and indicated by dotted line 38. Of course, it is to be understood that the term "coincidence" also includes configurations in which edge 34 lies substantially parallel to and extends in the same direction as line 38, as would occur where the common center of rotation of the two beams is not collinear with edge 34. To affect such pulsing of the output of transmitter 37, there is provided, in the embodiment shown, a simple switch mechanism including grounded movable contact 40 mounted at a predetermined position on turntable 35 for rotation therewith, and stationary contact 42 connected to transmitter 37, the latter being grounded. Contacts 40 and 42 are so located relative to one another as to be in contact and thereby complete a circuit for initiating transmission from transmitter 37 only when edge 34 is in coincidence with the reference direction line 38. Alternatively, to effect pulsing other means can be employed, such as a lamp and photocell arrangement or the like.

At the position, the distance or azimuth or both of which it is dsired to measure respectively from reference point 22 and from reference direction line 38, there is disposed receiver means, shown enclosed within the broken line indicated by the reference numeral 44. Generally, receiver 44 includes detector 46, sensitive or tuned to the fundamental frequencies of both beams 26 and 28.

Thus, upon rotation of turntable 35 at substantially constant angular velocity $\dot{a}$, energy is received every $2\pi/\dot{a}$ seconds in sequence first from beam 28 and then from beam 26, assuming that the turntable rotation is counterclockwise viewing FIGURE 1. To have a location determination of the position it is obvious that detector 46 must be within the geometric confines of the sweep of the azimuthally rotating beams 28 and 26.

The duration of the interval, $t$, depends upon the distance, R, from the reference point 22 to detector 46, the peripheral velocity of beams 26 and 28 at distance R being $R\dot{a}$.

Thus, $$t = \frac{d}{R\dot{a}} \text{ or } R = \frac{d}{t\dot{a}}$$

When transmitter 24 includes a maser operating in the visible spectrum, detector 46 can include a photomultiplier or the like. The output of detector 46, responsively to the sweep or rotation of the two beams, is shown in FIGURE 2A typically as a pair of sinusoid-type waves. Each wave of FIGURE 2A however, has a duration determined by the time required for a corresponding one of beams 26 and 28 to rotate or sweep through the position of detector 46, the end of the first or initial wave and the beginning of the second wave being separated by time interval $t$. The end of the first wave and the beginning of the second are representative of edges 34 and 33 respectively, but are usually gradual transitions. In order to determine more sharply signals representative of edges 34 and 33, the output of detector 46 is connected to shaper 48 which converts, in known manner, a sinusoid-type input wave into a rectangular wave output as shown in FIGURE 2B. This rectangular wave is characterized in having abrupt leading and trailing edges (i.e. negative and positive going transitions) and a duration very accurately related to, as for example being substantially equal to, the duration of the input sinusoid as determined by clipping the sinusoid at a predetermined amplitude (shown as a broken line in FIGURE 2A) set well above the average noise level for the detector output.

In order to derive, from the rectangular wave output of shaper 48 a signal which will determine $t$, the output of shaper 48 is connected to means, such as differentiator 50, providing an output (shown as FIGURE 2C) of sharp pulses located in time corresponding to and having the same respective polarity as the negative and positive going transitions of the rectangular wave forms of FIGURE 2B. These sharp pulses are separated according to their polarities as in separator 52 connected to the output of differentiator 50. Separator 52 typically can include unilateral conductive devices, such as diodes of appropriate type, which will pass only signals of a predetermined polarity. Thus, the output of separator 52 is in the form of two distinct and separate wave trains shown in FIGURES 2D and 2E each having a number of timed sharp pulses or spikes of a given polarity.

To the output of separator 52 having a wave train of a first polarity, for example the train of positive-going spikes of FIGURE 2D, there is connected the common input of a bistable device such as an Eccles-Jordan type of circuit or center-driven flip-flop 54. Characteristically, flip-flop 54 changes its output state each time it is triggered at its common input terminal by a spike of the wave train of FIGURE 2D. Thus, assuming the output of flip-flop 54 to be initially at a first or ground state, the first positive-going spike (corresponding in time to the beginning of reception by detector 46 of beam 28) will trigger flip-flop 54. The output of the latter then changes abruptly to a second state in which it will remain until the next positive-going spike (corresponding in time to the reception by detector 46 of edge 33 of beam 26). The latter spike will trigger the common input of flip-flop 54 so that the flip-flop output reverts abruptly to the ground state. The output waveform of flip-flop 54 is shown in FIGURE 2F.

Similarly, the output of separator 52 having a wavetrain of opposite polarity, e.g., the train of FIGURE 2E, is connected to another center-driven flip-flop 56, which will provide a substantially rectangular signal, as shown in FIGURE 2G, having a duration substantially equal to the time from the reception by detector 46 of edge 34 of beam 28 to the end of reception of beam 26.

The circuit shown in FIGURE 1 includes means for combining the waveforms of the two flip-flops 54 and 56 so as to provide an output wave form corresponding to the time period when the outputs of both flip-flops are in their second states. To this end, the output of flip-flop 54 is coupled to one input terminal of a two input terminal coincidence or AND gate 58. The output of flip-flop 56 in turn is coupled to the other input terminal of gate 58. Because gate 58 is enabled to provide a signal at its output only when signals representing the second states of the flip-flops are simultaneously present at the input terminals of the gate, the gate ouptput, as shown in FIGURE 2H, is a sharp rectangular wave form whose duration is almost exactly equal to time, $t$.

The output of gate 58 is connected to one input of similar AND gate 60. The other input terminal of gate 60 is connected to the output of precision pulse oscillator or digital clock 62. Thus, gate 60 when enabled by the output of gate 58 for time, $t$, will permit a steady supply of pulses from clock 62 to enter a digital counter-and-display device 64 connected to the output of gate 60. The count displayed on device 64 will have a magnitude related to R according to the equation hereinbefore noted, and device 64 is preferably so calibrated by choice of clock frequency. As means for returning the count displayed on device 64 to zero once per revolution of turntable 35, the output of, for example, flip-flop 54, is connected to the input of device 65. The latter includes means for differentiating the output waveform of flip-flop 54, and for separating the resulting pulses so as to obtain only that pulse or spike, such as is shown in FIGURE 2J, representing the initial moment of reception of beam 28. The output of device 65 is connected to a reset terminal of counter-and-display device 64; consequently, each output spike from device 65 resets the count in device 64 to zero and permits the counting operation to proceed from zero according to the timing of the output of gate 60.

Receiver means 44 also comprises second detector 66 which is sensitive to or tuned to the output frequency of transmitter 37. This latter frequency is preferably quite distinct from the frequency of the output transmitter 24. Radiated pulses from transmitter 37, synchronized with the positioning of turntable 35, are received by detector 66, and initiate operation of means for measuring the time interval occurring between a pulse from transmitter 37 and the reception by detector 46 of the transmission from transmitter 24, specifically edge 34. Such a timing means comprises flip-flop 68 having a pair of triggering input terminals, one of which is connected to the output of detector 66. The latter can be considered to include any demodulation, shaping and amplifying means desired to provide the form of input signal to the appropriate input terminal of flip-flop 68.

One output of flip-flop 68 is connected to one of two input terminals of coincidence or AND gate 70, the other of the input terminals of gate 70 being connected to a source, such as clock 72, of precision-timed digital pulses. The output of gate 70 is connected to an input counting terminal of counter-and-display device 74. The other triggering input terminal of flip-flop 68 is connected to a source of signals indicating that detector 46 is receiving beam energy. Thus, flip-flop 68 can be connected directly to the output of detector 46 (as shown in dotted line). However, for optimum accuracy in measurement, it is preferred to provide means, such as device 76, connected to the output of flip-flop 56 for differentiating the waveform shown in FIGURE 2G, and for separating the pulses indicative of the reception of edge 34 by detector 46. Device 76 is connected to the other triggering input terminal of flip-flop 68 as to constitute a source of pulse signals corresponding in time to passage of edge 34 through the position of receiver means 44.

Flip-flop 68 can be assumed initially to be in an output state at a first level which controls gate 70 so that the latter cannot pass any pulses from clock 72. The pulse output of detector 66 triggers flip-flop 68 to change its output state to a second level which enables or opens gate 70 and allows clock pulses to be tallied on device 74. For a value of $\dot{a}$ of $2\pi$ radians per second, for example, a convenient output repetition rate for clock 72 is 36,000 pulses per second, since each pulse is then equivalent to 0.01° of angular rotation of turntable 35. Display device 74 is preferably calibrated accordingly. Typically, both display devices 64 and 74 may conveniently comprise five decade decimal counters using ionizable gas-filled tubes for display purposes. A number of such devices are readily obtainable commercially and need not be further described here.

Gate 70 will continue to pass clock pulses to device 74 until finally disabled by the application of a disabling signal thereto, as for example, the reversion of the output state of flip-flop 68 to its first level. This occurs responsively to triggering of the flip-flop by the output of device 76 as edge 34 passes through the position of the receiver means. For the remainder of the rotation of turntable 35, the display and counter device 74 remains inactive; this period conveniently allows examination of the display to obtain a visual reading.

It is desirable to reset device 74 to a zero reading to permit renewal of the counting operation upon the next revolution of the turntable. To this end, display device 74 preferably is of the type capable of being erased or reset as by momentary interruption of its power supply, and such interruption is triggered by a signal from flip-flop 68 through a connection to a reset terminal of device 74.

In order to overcome statistical variances in the indicated count in device 74, it may be desirable to make observations of azimuth over several revolutions of transmitter 24 and average the results.

Since certain changes may be made in the above apparatus and method without departing from the scope of the invention herein disclosed, it is intended that all matter contained in the above description or shown in the accompanying drawing shall be interpreted in an illustrative and not in a limiting manner.

What is claimed is:
1. A broadcast apparatus for a position-determining system and comprising in combination:
   (a) broadcast means for providing a pair of directional beams of electromagnetic energy said beams being transmitted from points adjacent and laterally spaced from one another such that a given portion of one beam and a given portion of the other beam are substantially parallel to one another with each said beam portion passing through the point of transmission, said parallel portions being the same portions of each beam and lying between the edges of each beam; and
   (b) means for rotating said broadcast means about a center common to both beams and at a substantially fixed angular velocity in approximately a plane common to both parallel portions of said beams.
2. A broadcast apparatus as defined in claim 1, including means for providing during rotation of said broadcast means an omni-directional broadcast pulse of radiation at coincidence of a predetermined one of said portions of one of said beams with an arbitrary reference direction in said plane radial from said center.

3. A broadcast apparatus as defined in claim 1, including
   (c) means for providing an omnidirectional broadcast pulse of radiation; and
   (d) switch means connecting said means for rotating said broadcast means and said means for providing an omnidirecitonal broadcast upon coincidence of a predetermined one of said portions of one of said beams which is substantially parallel to the given portion of the other beam with an arbitrary reference direction radial from said center in said plane so as to initiate said pulse.

4. A broadcast apparatus for a position-determining system and comprising in combination:
   (a) broadcast means for providing a pair of directional beams of electromagnetic energy, said beams being spaced from one another such that a given edge of one beam and a given edge of the other beam are substantially parallel to one another, said edges being a pair selected from the pair of edges which are most adjacent and the pair of edges which are most remote; and
   (b) means for rotating said broadcast means about a center common to both beams and at a substantially fixed angular velocity in approximately a plane common to both of said pairs of edges.

5. A broadcast apparatus as defined in claim 4, including means for providing during rotation of said broadcast means an omnidirectional broadcast pulse of radiation at coincidence of a predetermined one of said edges with an arbitrary reference direction in said plane radial from said center.

6. A broadcast apparatus as defined in claim 4, including
   (c) means for providing an omnidirectional broadcast pulse of radiation; and
   (d) switch means connecting said means for rotating said broadcast means and said means for providing an omnidirectional broadcast;
   (e) said switch means being operative upon coincidence of a predetermined one of said edges with an arbitrary reference direction radial from said center in said plane so as to initiate said pulse.

7. A broadcast apparatus for a position-determining system and comprising in combination:
   (a) broadcast means for providing a pair of directional beams of electromagnetic energy, said beams being spaced from one another such that the edge of one beam and the edge of the other beam of said pair most adjacent one another are substantially parallel to one another; and
   (b) means for rotating said broadcast means about a center common to both beams and at a substantially fixed angular velocity in approximately a plane common to both of said parallel edges.

8. A broadcast apparatus as defined in claim 6 wherein said broadcast means comprises means for transmitting radiation at frequencies above one kilomegacycle per second.

9. A broadcast apparatus as defined in claim 6 wherein said broadcast means comprises an oscillator in which wave amplification is achieved through stimulated emission of radiation.

10. A broadcast apparatus as defined in claim 9 wherein both beams are derived from a single oscillator.

11. A broadcast apparatus for a position-determining system and comprising, in combination:
    (a) broadcast means for providing a pair of directional beams of energy, said beams being spaced from one another and positioned such that there is substantial parallelism between the most adjacent respective edges of said beams, and there is substantially reduced flux of said energy in the space between said beams;
    (b) means for rotating said broadcast means about a center common to both beams and at a substantially fixed angular velocity in a plane common to both of said edges.

12. A system for determining at least the distance of a first position from a reference position, and comprising:
    (a) broadcast means disposed at said reference position for providing a pair of directional beams of electromagnetic energy, said beams being spaced from one another such that a given edge of one beam and a given edge of the other beam are substantially parallel to one another, said edges being a pair selected from the pair of edges which are most adjacent and the pair of edges which are most remote;
    (b) means for rotating said beams about a common center at a substantially fixed angular velocity in substantially a plane common to both of said edges and said first position,
    (c) receiver means sensitive to said energy and disposed at said first position for providing discrete signals responsively to respective changes in received energy occurring upon rotation of said edges through said first position; and
    (d) means for timing an interval between discrete signals from said receiver means.

13. A system as defined in claim 12, including
    (e) means for indicating said distance as determined according to said interval.

14. A system as defined in claim 13, including
    (f) means for determining the azimuth of said first position relative to a radial reference direction from said reference position and comprising:
    (g) means providing an omnidirectional broadcast of radiation pulsed at coincidence of a predetermined one of said edges with said reference direction; and
    (h) means responsive to said omnidirectional broadcast and the change in radiant energy received upon rotation of said one of said edges through said first position for timing the rotation of said one edge from said reference direction.

15. A system for determining a position in approximately a plane relative to a reference point and comprising in combination:
    (a) means disposed at said reference point for providing a pair of spaced apart directional beams of electromagnetic radiation positioned with an edge of one beam substantially parallel to an edge of the other beam in said plane, adjacent the origin of said beams, said parallel edges being one pair of the pair of immediately adjacent edges and the pair of most remote edges;
    (b) means for rotating said beams in said plane at a substantially fixed angular velocity while maintaining said edges substantially parallel;
    (c) means providing an omnidirectional wave broadcast pulsed at coincidence of a predetermined one of said edges with a radial reference direction;
    (d) means located at said position for receiving said radiation and being responsive to the respective changes in radiant energy received upon rotation of said edges through said position;
    (e) means for timing an interval between occurrence of said changes; and
    (f) means located at said position for receiving and being responsive to said omnidirectional broadcast; and
    (g) means for timing an interval between the occurrence of a change in radiant energy received upon rotation of said one of said edges through said position and the time of reception of said omnidirectional broadcast.

16. A system for determining a position in substantially a plane relative to a reference point in said plane, and comprising:
    (a) means disposed at said reference point for providing a pair of directional beams of electromagnetic energy, said beams being spaced from one another such that a given edge of one beam and a given edge of the other beam are substantially parallel to one another, said edges being a pair selected from the pair of edges which are most adjacent and the pair of edges which are most remote;

(b) means for rotating said beams at a substantially fixed angular velocity around a common center at least in a plane approximately common to both edges and said position, (c) means providing an omnidirectional broadcast of radiation pulsed at coincidence of a predetermined one of said edges with a radial reference direction;

(d) means located at said position and responsive to the respective changes in radiant energy received upon rotation of said edges through said position for timing the occurrence of said changes; and (e) means responsive to said omnidirectional broadcast and the change in radiant energy received upon rotation of said one of said edges through said position for timing the rotation of said one edge from said reference direction.

17. A system for determining a position in substantially a plane relative to a reference point in said plane, and comprising, in combination:

(a) broadcast means for providing a pair of directional beams of electromagnetic energy, said beams being spaced from one another such that the edge of one beam and the edge of the other beam most adjacent one another are substantially parallel to one another;

(b) means providing a broadcast of radiation pulsed at coincidence of a predetermined one of said edges with a radial reference direction, (c) means for rotating said broadcast means about a center common to both beams and at a substantially fixed angular velocity in a substantially plane common to both of said edges; and (d) said position receiving apparatus located at said position and including a first receiver for providing first and second discrete signals responsively to changes in received energy occurring upon rotation of said respective edges through said position;

(e) a second receiver responsive to said pulsed broadcast for providing a third discrete signal;

(f) bistable means coupled to said receivers so as to be triggered by one of the first and second discrete signals corresponding to the received energy change due to rotation of said one edge through said position and by the third discrete signal, for providing an output signal having a duration determined by an interval between the discrete signals respectively applied thereto, (g) a clock pulse generator;

(h) gate means coupled to said generator and enabled by the output signal from said bistable means so as to pass pulses from said generator; and (i) a digital counter for counting the pulses passed by said gate means.

18. A system for determining a position in substantially a plane relative to a reference point in said plane, and comprising, in combination:

(a) broadcast means for providing a pair of directional beams of electromagnetic energy, each beam having inner and outer edges, said beams being spaced from one another such that an edge of one beam and an edge of the other beam most adjacent one another are parallel to one another;

(b) means providing a broadcast of radiation pulsed at coincidence of a predetermined one of said edges with a radial reference direction;

(c) means for rotating said broadcast means about a center common to both beams and at a substantially fixed angular velocity in a plane substantially common to both of said parallel edges;

(d) detector means disposed at said position and being responsive to said energy for providing a first signal having a duration corresponding to the time of rotation of one of said beams through said position and a subsequent signal having a duration corresponding to the time of rotation of the other of said beams through said position, said signals being spaced from one another by an interval corresponding to the time of rotational transit of said edges through said position;

(e) means providing third and fourth signals each of substantially rectangular waveform of duration corresponding respectively to said first and second signals and being spaced in time according to said interval;

(f) means providing fifth and sixth signals having durations respectively established by the time spacing between the leading edges of said third and fourth signals and by the time spacing between the trailing edges of said third and fourth signals;

(g) means providing a seventh signal having a duration established by those portions of said fifth and sixth signals which coincide in time;

(h) a clock pulse generator; and (i) gate means connected to said generator and being enabled by said seventh signal to pass pulses from said generator for only the duration of said seventh signal.

19. A system as defined in claim 12 wherein said receiver means includes a single antenna.

References Cited

UNITED STATES PATENTS

| | | | |
|---|---|---|---|
| 2,524,758 | 10/1950 | Browder | 343—106 |
| 2,677,821 | 5/1954 | Bouzitat et al. | 343—106 |
| 2,354,665 | 8/1944 | Church et al. | 240—1.2 |
| 3,010,416 | 11/1961 | Mueller | 244—77 |
| 3,350,714 | 10/1967 | Walker et al. | 343—106 |

FOREIGN PATENTS

| | | |
|---|---|---|
| 108,643 | 9/1939 | Australia. |
| 458,347 | 12/1936 | Great Britain. |

RODNEY D. BENNETT, *Primary Examiner.*

H. C. WAMSLEY, *Assistant Examiner.*